United States Patent Office 2,839,419
Patented June 17, 1958

2,839,419
WATER-SOLUBLE THERMOPLASTIC CELLULOSE ETHER COMPOSITIONS

Francis E. Windover, Arthur W. Anderson, and George K. Greminger, Jr., Midland, Mich., assignors to The Dow Chemical Company, Midland, Mich., a corporation of Delaware No Drawing. Application July 11, 1956
Serial No. 597,089

3 Claims. (Cl. 106—188)

This invention relates to water-soluble thermoplastic compositions based on certain cellulose ethers. More particularly it relates to such compositions comprising water-soluble hydroxyalkyl alkyl cellulose ethers which are themselves sufficiently thermoplastic to melt without decomposition.

A method for the fabrication by thermal means of flexible and rigid articles, such as films and sheets, from water-soluble cellulose ethers, has long been desired. It has also been desired to have thermoplastic compositions based on water-soluble cellulose ethers which could be formed by conventional methods into heat-sealable films and sheets. Thermoplastic compositions made from non-thermoplastic water-soluble cellulose ethers have been disclosed, but they require such large amounts of plasticizer that rigid articles cannot be produced except by forming very thick sections. When either films or sheets were desired, it was necessary to cast or to dip the ethers from an aqueous solution, usually containing a small amount of a humectant, and subsequently to evaporate the water. Because of the unique solubility characteristics of most of the cellulose ethers in water, the fabrication of shaped articles from aqueous solutions is very difficult to control. It would be desirable if existing molding and heat sealing equipment and methods could be employed to form such articles.

There are many other considerations for water-soluble, thermoplastic, cellulose ether compositions which are desirable. When the films and sheets are to be used in contact with foodstuffs, every ingredient in the composition must be non-toxic and must be stable in the presence of the foodstuff. All of the ingredients of the composition must be compatible if transparent films and sheets are to be produced.

In view of the above requirements and considerations it would be desirable to have and it is accordingly the principal object of this invention to provide new and improved water-soluble, thermoplastic compositions consisting chiefly of water-soluble cellulose ethers which are themselves thermoplastic.

It is a further object to provide such compositions which may be formed into articles capable of being heat sealed.

The above and related objects are accomplished by using compositions consisting of certain water-soluble, thermoplastic hydroxyalkyl alkyl cellulose ethers as will be described together with plasticizing amounts of 2-hydroxyalkyl ethers of glycerol where in the hydroxyalkyl ether groups have from 2 to 3 carbon atoms.

The cellulose ethers which are useful in carrying out the invention are those hydroxyalkyl alkyl cellulose ethers in which the hydroxyalkyl groups have from 2 to 3 carbon atoms, the alkyl groups have from 1 to 3 carbon atoms, and which melt at a temperature appreciably below their decomposition temperature, and which are soluble in water and certain organic solvents. Typical examples of useful ethers are the hydroxyethyl methyl and hydroxypropyl methyl ethers of cellulose when etherified to an extent as will be described.

The cellulose ethers may be prepared by known two step processes, but it is preferred to employ a one step process. As illustrative of such a process, cellulose is treated with from 30 to 60 percent aqueous caustic soda solution to give an alkali cellulose with a ratio of from 0.7 to 1.5 parts by weight of NaOH per part of cellulose. The alkali cellulose is then mixed with from 1.1 to 2.0 parts of methyl chloride per part of cellulose and with 0.45 to 0.50 part of propylene oxide, or its molar equivalent of ethylene oxide, per part of cellulose at a temperature below 40° C. for a short time, followed by reaction at 60° C. or higher until etherification is substantially complete. The product is washed with hot water at a temperature above its aqueous gel point to remove water soluble impurities.

Although it is difficult to determine the proportions and amounts of each substituent in a mixed cellulose ether and especially when that ether has been prepared by a single step process, it has been found that the cellulose ethers useful in this invention should have from about 7 to 10 percent hydroxypropoxy substitution and from 28 to 30 percent methoxy substitution, or the corresponding equivalent substitution for hydroxyethoxy, ethoxy, and propoxy. It is common practice to characterize the ethers by their physical or chemical properties, such as melting point of the ether or gel point of its water solutions. In the case of this invention, the existence of the desired degree of etherification is best determined by measuring the softening, melting, and decomposition temperatures of the ether product. Those temperatures are easily determined by using a melting bar which has progressively increasing temperatures along its length. Films of constant thickness are made up and small pieces placed at varying points along the bar. To be useful here, the mixed ethers should have a spread of at least 10 and preferably 20 or more centigrade degrees between melting and decomposition temperatures.

The useful cellulose ethers have gel points in water that are between those of alkyl celluloses and the corresponding commercial hydroxyalkyl alkyl celluloses. For example, the methyl celluloses of commerce have aqueous gel points of from about 45 to 50° C.; the commercial hydroxypropyl methyl celluloses have aqueous gel points above 60° C.; and the cellulose ethers of this invention have gel points of about 55° C. The ethyl derivatives show similar differences in gel points in aqueous solution.

When the thermoplastic ethers of this invention are used, it is possible to use smaller amounts of plasticizer to give a moldable composition than when non-thermoplastic ethers are used. It is also possible to use a single plasticizer rather than complex mixtures of plasticizers.

The useful plasticizers in the compositions of this invention are the hydroxyalkyl glycerols having from 2 to 3 carbon atoms in each alkyl group. It is possible to use the mono-, di-, or tri-substituted glycerols. In the preparation of the glycerol ethers minor amounts of the ethers other than the one described are sometimes formed. Likewise minor amounts of unreacted glycerine may be present in the final product. Such mixtures in the product may be used with equally effective results as the pure product.

As illustrative of the preparation of the glycerol ethers, the method of preparation of mixed (2-hydroxypropyl) glycerol will be described. Into a pressure vessel was placed 1 molar part of glycerine, an amount in slight excess of 3 molar parts of propylene oxide, and 0.3 percent based on the weight of the above reactants of sodium hydroxide as a 50 percent aqueous caustic solution. The vessel was heated to about 100° C. to cause reaction and the vessel cooled externally as the reaction proceeded to assure a constant pressure. When the reaction was completed as indicated by a pressure drop to a constant minimum pressure, the product was drained from the vessel. No further purification was necessary. If desired the sodium hydroxide may be neutralized. The product does not have to be dried when prepared in this manner, since the compositions are frequently used in aqueous solution.

The amount of cellulose ether that may be used in the thermoplastic compositions of this invention may be varied within wide limits between 2 and about 90 percent. It should be apparent that the concentration employed will depend on the properties desired in the finished article, on the method of fabrication, and on the viscosity type of the cellulose ether used. For compression molding and vacuum drawing of sheets, it is possible to use as little as 10 to 30 percent plasticizer, while for applications such as the formation of semi-rigid sheet, it is preferred to use from 5 to 30 percent cellulose ether and from 95 to 70 percent plasticizer. When the compositions are to be cast into flexible films from a solution in an auxiliary solvent, such as water, the plasticizer should be used in an amount of from about 25 to 50 percent of the composition. With the higher viscosity grades of cellulose ether (over 4,000 centipoises as measured from a 2 percent aqueous solution at 20° C.), it is extremely difficult to make concentrated solutions of the ether in plasticizer, and such solutions are too viscous for conventional means of fabrication.

It is well known that the degree of substitution of cellulose ethers giving a minimum softening temperature coincides with that degree of substitution giving maximum organic solubility. However, with the simple alkyl ethers, it is equally well known that as the organic solubility is increased the water solubility is correspondingly decreased. The hydroxyalkyl alkyl cellulose ethers of this invention, however, retain their water solubility as the degree of substitution is increased.

The compositions of this invention may be molded into clear, transparent, water-soluble films. Such film may also be prepared by casting a solution of the composition in water, water and methanol, or benzene and methanol. The films are capable of being sealed to each other using conventional heat sealing equipment.

The advantages of these compositions will be more apparent from the following illustrative examples wherein all parts and percentages are by weight unless otherwise indicated.

EXAMPLE I

Several films were cast from aqueous solutions of compositions. The compositions consisted of various cellulose ethers including those within the scope of this invention as well as carboxymethyl cellulose and corn starch for comparative purposes. The films were about 0.01 inch in thickness. The tensile strength and elongation of the films were measured and the results listed in Table I. The plasticizer used was glycerol tris-(2-hydroxypropyl) ether. One sample used no plasticizer and is included for comparison.

*Table I*

| Cellulose Ether | Percent glycerol ether | Tensile Strength (kg./cm.²) | Elongation (percent) |
| --- | --- | --- | --- |
| Hydroxypropyl methyl (50 cps.). | 33.3 | 277 | 85 |
| Hydroxypropyl methyl (1,500 cps.). | 33.3 | 381 | 76 |
| For Comparison: | | | |
| Hydroxypropyl methyl (1,500 cps.). | None | 563 | 5 |
| Carboxymethyl | 33.3 | Incompatible | |
| Corn starch | 33.3 | Film too brittle for testing. | |

The results show that glycerol tris-(2-hydroxypropyl) ether is an efficient plasticizer for the mixed ethers of this invention while having no plasticizing effect on substances of somewhat similar chemical structure.

EXAMPLE II

The heat sealing tendencies of several films were evaluated. The films were prepared by casting solutions of hydroxypropyl methyl cellulose plasticized with various plasticizers. The heat sealing abilities were determined by placing two thicknesses of film between the jaws of an electrical bar heat sealer and determining the temperature at which sealing occurred. The results are listed in Table II.

*Table II*

| Cellulose Ether | Plasticizer | Percent Plasticizer | Sealing Temperature (° C.) |
| --- | --- | --- | --- |
| Hydroxypropyl methyl (50 cps.). | Propylene glycol | 10 | Could not be heat-sealed. |
|  | Sorbitol | 10 |  |
|  | Glycerine | 10 |  |
| Do | Glycerine | 30 | Do. |
| Do | Glycerol mono-(2-hydroxypropyl). | 30 | 320. |
| Do | Glycerol bis-2-hydroxypropyl). | 30 | 320. |
| Do | Glycerol tris-2-hydroxypropyl). | 30 | 330. |

The propylene glycol-sorbitol-glycerine sample, included for comparison, could not be heat sealed regardless of the proportions of the ingredients used.

Similar results were obtained when the 2-hydroxyethyl ethers of glycerine were used and also when the cellulose ether used was a hydroxyethyl methyl cellulose.

The cellulose ethers useful in this invention soften and melt several degrees below their decomposition temperatures. In contrast, the conventional water-soluble cellulose ethers available commercially do not melt below their decomposition temperatures. Thus, the ethers useful in this invention are those which exhibit sufficient thermoplasticity to be thermally fabricated, whereas the more common water-soluble cellulose ethers decompose before softening enough to be molded.

We claim:

1. A thermoplastic composition consisting essentially of (a) from 2 to 90 percent by weight of a water-soluble, thermoplastic hydroxyalkyl alkyl cellulose ether in which the hydroxyalkyl group contains from 2 to 3 carbon atoms and the alkyl group contains from 1 to 3 carbon atoms and which has a melting point which is at least 10 degrees centigrade below the decomposition temperature, and (b) correspondingly from 98 to 10 percent of a plasticizer selected from the group consisting of glycerol mono-2-hydroxyalkyl ether, glycerol bis (2-hydroxyalkyl) ether, and glycerol tris (2-hydroxyalkyl) ether wherein each 2-hydroxyalkyl group contains from 2 to 3 carbon atoms.

2. The composition claimed in claim 1 wherein said water-soluble, thermoplastic hydroxyalkyl alkyl cellulose ether is a hydroxypropyl methyl cellulose having a melting point which is at least 10 degrees centigrade below the decomposition temperature.

3. A water-soluble, heat-sealable, transparent film of a composition as claimed in claim 1.

References Cited in the file of this patent

UNITED STATES PATENTS 1,877,856     Hagedorn et al.     Sept. 20, 1932

OTHER REFERENCES

"Tylose Cellulose Derivatives," Perdue, CIOS Blacklist Item 22, British Intelligence Objectives Sub-Committee (1945), 106–197.

Miner et al.: "Glycerol," page 371 (1953).